United States Patent [19]

Kaplan et al.

[11] Patent Number: 4,931,071

[45] Date of Patent: * Jun. 5, 1990

[54] METHOD FOR DENSELY PACKING MOLECULAR SIEVE ADSORBENT BEDS IN A PSA SYSTEM

[75] Inventors: Robert H. Kaplan, New City, N.Y.; Alberto LaCava, South Plainfield, N.J.; Arthur I. Shirley, South Orange, N.J.; Steven M. Ringo, Springtown, N.J.

[73] Assignee: The BOC Group, Inc., New Providence, N.J.

[*] Notice: The portion of the term of this patent subsequent to Aug. 1, 2006 has been disclaimed.

[21] Appl. No.: 321,480

[22] Filed: Mar. 9, 1989

[51] Int. Cl.⁵ .............................................. B01D 53/04
[52] U.S. Cl. ............................................. 55/25; 55/75; 55/389
[58] Field of Search ................... 55/25, 26, 68, 74, 75, 55/97, 387, 389, 518, 519; 210/503; 502/417

[56] References Cited

U.S. PATENT DOCUMENTS

| | | |
|---|---|---|
| 3,757,490 | 9/1973 | Ma .................... 55/389 X |
| 3,801,513 | 4/1974 | Munzner et al. ............ 55/75 X |
| 3,960,769 | 6/1976 | Munzner et al. ............ 502/417 |
| 3,960,771 | 6/1976 | Tanaka et al. ............ 55/389 X |
| 3,962,129 | 6/1976 | Münzner et al. ............ 55/75 X |
| 4,264,339 | 4/1981 | Jüntgen et al. ............ 55/75 X |
| 4,283,204 | 8/1981 | Savage .................... 55/75 X |
| 4,312,641 | 1/1982 | Verrando et al. ............ 55/75 X |
| 4,344,775 | 8/1982 | Klein .................... 55/97 X |
| 4,415,340 | 11/1983 | Knoblauch et al. ............ 55/75 X |
| 4,440,548 | 4/1984 | Hill .................... 55/75 X |
| 4,458,022 | 7/1984 | Ohsaki et al. ............ 502/42 |
| 4,572,723 | 2/1986 | Ward .................... 55/75 X |
| 4,617,035 | 10/1986 | Wakaizumi et al. ............ 55/389 |
| 4,677,096 | 6/1987 | van der Smissen ............ 55/75 X |
| 4,853,004 | 8/1989 | Kaplan et al. ............ 55/25 |

FOREIGN PATENT DOCUMENTS 0218403 4/1987 European Pat. Off. .
55-061915 5/1980 Japan .................... 55/75

Primary Examiner—Robert Spitzer
Attorney, Agent, or Firm—Carol A. Nemetz; Larry R. Cassett

[57] ABSTRACT

The improvement in the separation of gaseous mixtures by pressure swing adsorption (PSA) is disclosed. The interparticle voids in kinetically-selective PSA adsorbent beds are filled with fine particles of kinetically-selective adsorbent. The ratio of the average diameter of the coarse adsorbent particles to the average diameter of the fine particles, the size of the fine particles themselves and the percent of volume of the fine particles in the bed are all critical to optimum PSA performance.

9 Claims, 2 Drawing Sheets

METHOD FOR DENSELY PACKING MOLECULAR SIEVE ADSORBENT BEDS IN A PSA SYSTEM

RELATED APPLICATIONS

This application is a continuation-in-part of U.S. Pat. application Ser. No. 146,017 filed Jan. 20, 1988 now U.S. Pat. No. 4,853,004.

This invention relates to gas enrichment utilizing pressure swing adsorption techniques, and more particularly to an improved pressure swing adsorption process wherein the efficiency of the adsorbent bed is improved by packing with coarse and fine kinetically-selective molecular sieve particles.

BACKGROUND OF THE INVENTION

The use of adsorption techniques to separate a gaseous component from a gaseous stream was initially developed for the removal of carbon dioxide and water from air. Gas adsorption techniques are now conventionally employed in processes for the enrichment of hydrogen, helium, argon, carbon monoxide, carbon dioxide, nitrous oxide, oxygen and nitrogen. Gas enrichment utilizing at least one, typically two, adsorption vessels in a cycling pressurized relationship is commonly referred to as pressure swing adsorption (PSA).

A typical PSA process for enriching a gas, for example nitrogen from air, employs at least one, generally two or more, adsorption beds filled with molecular sieve material, each being subjected to two or more, generally four, distinct processing steps in each cycle. In a first step of the cycle, one adsorption bed is pressurized with concomitant nitrogen production while the other bed is regenerated, such as by venting. In a second step, often referred to as pressure equalization, the adsorption beds are placed in fluid communication, thereby being brought to an intermediate pressure. In a third step, the first adsorption bed is regenerated, sometimes with a countercurrent flow of product-quality gas to enhance the regeneration (referred to as "purge"), while the second bed is pressurized with concomitant nitrogen product. The last step of the cycle is pressure equalization between the beds. During such pressure swings, pressure conditions in the adsorption beds typically vary from about 15 psig to 120 psig in a process employing carbon molecular sieves for nitrogen production and somewhat lower pressure ranges in processes employing crystalline zeolites for producing oxygen.

Although pressure swing adsorption (PSA) techniques have been refined to some degree, PSA still suffers certain disadvantages inherent in being a cyclic process. For example, in the process of separating a strongly adsorbed component from a weakly adsorbed product component of a gaseous mixture, the purge step of the PSA cycle serves the desirable function of removing the strongly adsorbed component from the sieve, but is also accompanied by an undesirable loss of the product component which is contained in the interparticle voids of the bed. The interparticle voidage of a typical adsorbent bed is about forty percent of the total bed volume and, therefore, losses from this source can be significant.

The problem is substantially alleviated and overall performance of the PSA process markedly improved in accordance with the present invention by combining certain percentages of fine particulate kinetically-selective molecular sieve with conventional coarse particles thereof to achieve an optimum volume ratio of comparatively coarse and fine kinetically-selective sieve particles in the bed. A very significant enhancement in yield can be achieved by using these beds in PSA processes, such as nitrogen enrichment.

It is known to combine in a vessel coarse and fine particles intended for adsorption of a material. Ma, U.S. Pat. No. 3,757,490, discloses such a particle mix in a system intended for solid-liquid chromatographic separations. The particles utilized by Ma are all active adsorbent particles and are relatively close in size range in that ninety percent by weight have a diameter within ten percent of the average diameter of all particles. Ma is also concerned only with a solid-liquid system which is markedly different from a PSA gas separation system. Most important, the particles of adsorbent in Ma's system are equilibrium selective as opposed to kinetically selective as will be discussed below.

More recently, Greenbank in European Patent 0 218 403 discloses a dense gas pack of coarse and fine adsorbent particles wherein the size of the largest fine particles is less than one-third of the coarse particles and sixty percent of all particles are larger than sixty mesh. Although not specifically stated, it is evident from the examples that these percentages are by volume. This system is designed primarily for enhancing gas volume to be stored in a storage cylinder. It is mentioned, however, that it can be utilized for molecular sieves. There is nothing in this application, however, which would give insight into the fact that significantly enhanced PSA efficiency could be obtained by combining coarse and fine particles of kinetically-selective sieve material in a single bed. It has been found in accordance with the present invention that, within certain limits as will be defined, a mixture of coarse and fine kinetically-selective sieve particles will unexpectedly give enhanced PSA performance.

SUMMARY OF THE INVENTION

There is provided a means of significantly enhancing the performance of a pressure swing adsorption system by packing the adsorbent beds thereof with kinetically-selective molecular sieve adsorbent from about ten to fifty percent by volume of fine particles and from about fifty to ninety percent by volume of coarse particles, wherein the ratio of the average diameter of the coarse particles, or pellets, to the average diameter of the fine particles is from about five to about fifteen to one and the fine particles are greater than 200 mesh, preferably forty to sixty mesh.

DETAILED DESCRIPTION OF THE INVENTION

Figure 1:
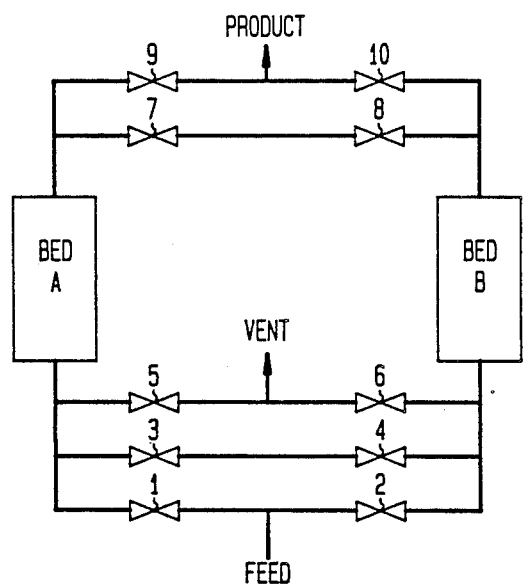
FIG. 1 is a schematic of a conventional PSA system comprising two adsorbent beds.

In order to appreciate the unexpected nature of the present invention, it is initially necessary to understand the basic differences between equilibrium adsorption and kinetic adsorption. For prospective, an adsorbent which behaves as a true molecular sieve performs "steric" separation. Separation based on a large difference in the adsorption rate between or among components of a gaseous mixture to be separated is known as "kinetic" separation. Separation based on the difference in the equilibrium amount of the adsorption an adsorbent provides is "equilibrium" separation. All adsorbents have equilibrium adsorption capabilities, but they are of widely varying effect on a given process.

Zeolites, for example, are capable of performing steric separation, but most commercial applications thereof, including air separation are based on equilibrium separation. Carbon molecular sieve (CMS), on the other hand, separates air in a pressure swing adsorption (PSA) unit kinetically since, for a CMS, the amount of nitrogen adsorbed at equilibrium is almost equal to the amount of oxygen adsorbed. However, the adsorption rate for oxygen is much greater that of nitrogen. It is, therefore, possible to produce purified nitrogen in a PSA unit utilizing a CMS by adsorbing large quantities of oxygen under nonequilibrium conditions. Certain adsorbents, such as modified 4A zeolites, will produce nitrogen at short cycles, i.e. under 20 seconds and enriched oxygen at longer cycle times. This represents the transition from kinetic to equilibrium separation.

The present invention is directed to a PSA system wherein the adsorbent beds contain a particular mixture of coarse and fine kinetically-selective adsorbent material, i.e. molecular sieve. The size relationship between the coarse and fine adsorbent particles, as well as the ratio of percent by volume of each type of material, are critical parameters in improving PSA efficiency.

Pressure swing adsorption (PSA) is a known process which can be advantageously employed to selectively adsorb various components of readily available feed gas mixtures, thereby separating and purifying a desired product gas. For example, PSA can be advantageously used to separate nitrogen from air. Other applications of PSA include the separation and purification of hydrogen present as a major component of a feed gas mixture also containing carbon dioxide as a selectively adsorbable component, commonly together with one or more additional minor components to be removed as undesired impurities, such as nitrogen, argon, carbon monoxide, and the like.

The PSA process, in general, can be carried out using any kinetically-selective adsorbent material having a selectivity for one or more components of a gaseous mixture. Suitable adsorbents include certain zeolite molecular sieves and activated carbon. Zeolite molecular sieve adsorbents are generally preferable for the separation and purification of hydrogen contained in mixtures with carbon dioxide and the like. The preferred material utilized to separate nitrogen from air is an activated carbon having pores which have been modified so that oxygen molecules are kinetically selectively adsorbed from nitrogen molecules commonly known as carbon molecular sieve (CMS). A preferred CMS material is prepared according to the process described in U.S. Pat. No. 4,458,022.

A basic two-bed PSA process is shown schematically in FIG. 1. In FIG. 1, the valves controlling flow of feed into the system, product withdraw and waste gas venting from adsorbent beds A and B are numbered 1 through 10. A full cycle on a conventional PSA unit as shown in FIG. 1 is as follows:

| Step | Bed A | Bed B |
|---|---|---|
| 1 | _Bed Pressure equalization_ | |
| 2 | Pressurization and Product release | Vent to Atmospheric Pressure |
| 3 | Constant feed and Product release | Vent to Atmospheric Pressure |
| 4 | _Bed Pressure equalization_ | |
| 5 | Vent to atmospheric pressure | Pressurization and product release |
| 6 | Vent to atmospheric pressure | Constant feed and product release |

Figure 2:
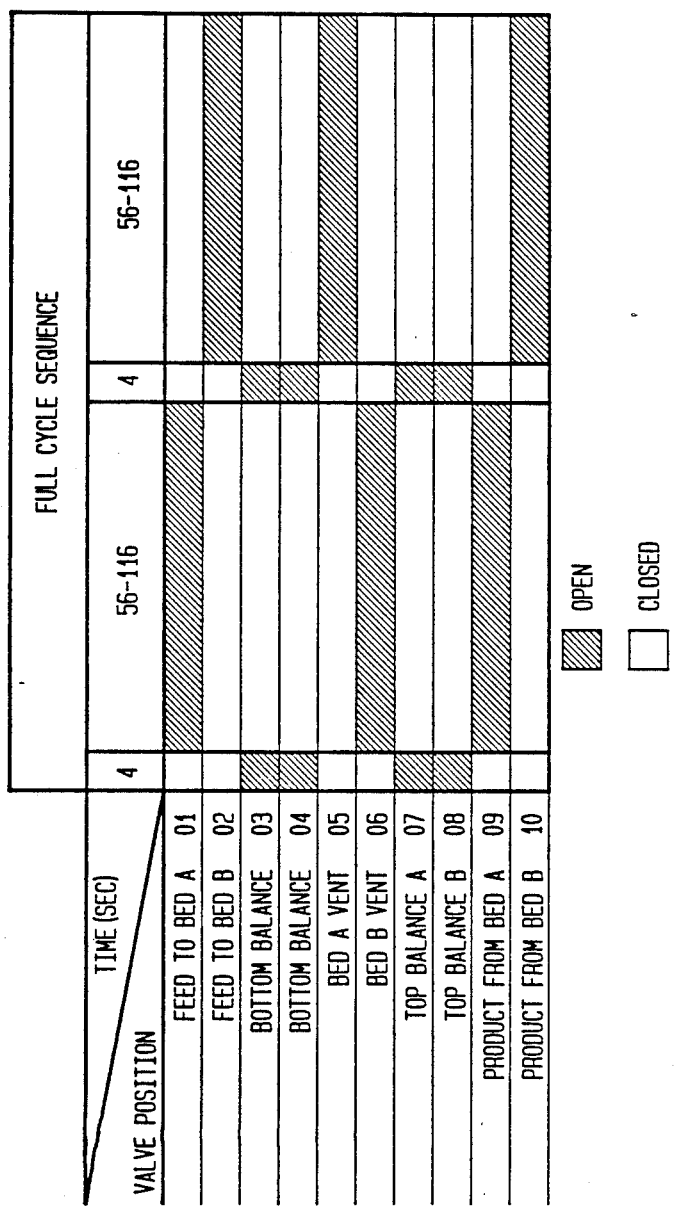
FIG. 2 is a chart of the sequence of steps in the PSA cycle using the PSA system shown in FIG. 1.

Typical timing and value positions are shown in FIG. 2 using a cycle time of 120 seconds and 100 psig product pressure.

In conventional PSA processes, the adsorbent columns are packed with adsorbent material, e.g. carbon molecular sieve (CMS), in pellet or bead form. The pellet form of CMS as is commercially available can have an average diameter of from 1 to 7 mm, preferably 2,5 to 3 mm. The packing of a bed with such CMS material results in a certain amount of void volume which is the space between the pellets or beads where no material will fit. The gas that fills the void volume does not interact with the sieve material and, therefore, adversely affects the efficiency of the unit in several ways. The impure gas in the void space will combine with product gas thereby reducing productivity Interstitial gas in the void spaces must be vented during regeneration thereby producing an increased amount of vent gas and, if a purge step is utilized, requiring a greater quantity of purge gas to clean the bed. If the purge gas is product quality, this represents an additional loss in efficiency.

An adsorbent capable of kinetic adsorption can also perform equilibrium separation simply by lengthening the cycle time. The length of time necessary for an adsorbent to adsorb 50 percent of its capacity for a particular gas species is known as the "adsorption half-time". If the process cycle time is much greater than the adsorption half-time for the gas component most slowly adsorbed, there will be an equilibrium separation. If the cycle time is shorter, the separation will be kinetic.

In order to kinetically separate a gas mixture containing two main components, such as air, there must be a significant difference in their adsorption half-times. For an equilibrium separation, there must be a significant difference in the equilibrium adsorption constants. These two ratios are not necessarily compatible.

Mixing coarse and fine particles of an adsorbent will improve an equilibrium separation of a fluid mixture by reducing the void volume in the bed. Since the particles have the same particle density, the mixture will have a higher density than either the coarse or fine component alone.

Consequently, increasing the packing density of the adsorbent in an equilibrium separation will improve the separation as is the case with Ma U.S. Pat. No. 3,757,490. The magnitude of the bulk density increases with the difference in size ratio of the particles. Therefore, greater size ratio of coarse to fine particles will improve equilibrium separation. This is true up to the point where the reduction in void volume produces adverse hydrodynamic effects and a deterioration in the process.

For a kinetic separation, however, other factors come into consideration which negate the benefit of reduced voidage. Reducing the particle size of kinetic adsorbents increases their speed and, as a consequence, reduces half-times. Therefore, for normal PSA cycles, reduction in particles size of the adsorbent brings the separation closer to equilibrium. Since a kinetic adsorbent such as CMS cannot perform air separation at equilibrium conditions, it would be expected that, as particle decreases, kinetic separation becomes more difficult.

These considerations would be expected to hold true for a mixture of coarse and fine kinetically-selective adsorbent since, as the difference in average particle size of the mix increases, the difference in the disparity in half-times also increases. An increase in the variance between kinetic half-times is known to lead to a loss of performance for kinetic separations. This is true even when the particles are uniform in size and the variance is caused by other factors. All other factors being constant, it would be expected, therefore, that mixing coarse and fine particles of a kinetically-selective adsorbent would adversely affect the separation, i.e., exactly the opposite of what would be expected from the effect on an equilibrium separation.

Although it is to be expected that kinetic separation would always lead to a deterioration in performance when coarse and fine kinetically-selective adsorbent particles are combined, it has been found in accordance with this invention that there exists a size range of such a mixture where the separation is improved over that of the coarse component alone. The change in performance is increased with increasing fine particle size moving from a performance less relative to the coarse particles alone to an eventual performance improvement.

In a PSA unit wherein the fine particles in the adsorbent bed are too small, fluidization of the particles within the bed will take place due to the large pressure changes. The fluidized fines exert a grinding action which reduces the size and effectiveness of the coarse particles and reduces the fines themselves to dust. Those skilled in the art recognize that dust is very undesirable in a PSA operation both as a product contaminant and because of detrimental effects, e.g. plugging on valves, analytical instrumentation and the like.

We have found that specific ranges for particle size for the fines, the size ratio of the fines to the coarse particles, and the percent by volume ratio of the fines to the coarse particles in the bed, are all essential to the optimum performance of the PSA unit. There are disadvantages in utilizing fine particles of too small as well as too large dimension. With both particles, the critical size dimension is the average diameter as defined by a weight averaging technique. This critical factor is the extruded diameter for commercial pellets or the geometric average of the screen openings for the upper and lower mesh sizes for special or irregularly-shaped fines. The fine particles according to the present invention are greater than 200 mesh, i.e. all particles will be retained on a U.S. Standard Mesh 200 sieve. When utilizing commercially available CMS pellets having an average diameter of 2.5 to 3 millimeters, for example, the fines should preferably have a particle size of −40/+60 U.S. Standard Mesh, i.e. all particles will pass a U.S. Standard Mesh 40 sieve and be retained on a U.S. Standard 60 Mesh sieve. This is equivalent to a particle size of from about 250 to 375 microns. It will be appreciated by those skilled in the art that these dimensions are exemplary and represent an optimum range for the diameter of the coarse particles.

The relative size ratio of the coarse to fine particles is likewise critical in achieving optimum PSA performance for a kinetically-selective adsorbent material, i.e., CMS. We have found that the ratio of the critical dimension of the coarse particles, i.e. the average diameter of commercial CMS pellets, to the average diameter, as defined herein, of the fine particles should be between about 5:1 and 15:1, preferably between about 6.6:1 and 12:1. While these ratios are generally applicable, those skilled in the art will appreciate that there are practical size limitations of commercially available CMS or other adsorbents and that these, in turn, dictate the size limitations of the fine particles to be combined therewith.

The final criterion to be considered in achieving an adsorbent bed packing for optimum PSA performance is the volume ratio of fine to coarse particles in the bed. It will be appreciated that the volume ratio and weight ratio will be approximately the same when the fine particles are comminuted coarse adsorbent material. Hence, it is preferred to express the percentage fill in terms of volume. It has been found that the percent by volume of fine particles in the bed should be from about 10 to 50, preferably from about 38 to 42, and most preferably about forty.

The following Examples further illustrate this invention, it being understood that the invention is in no way intended to be limited to the details described therein. In the Examples, all parts and percentages are on a volume basis and all temperatures are in degrees Celsius, unless otherwise stated.

EXAMPLE 1

A series of experimental runs was conducted utilizing a conventional PSA unit as illustrated in FIG. 1, and a range of cycle times of from 90 to 480 seconds according to the flow diagram as shown in FIG. 2. The adsorbent beds contained approximately 2 liters of commercial 2.5 mm CMS, Kuraray Chemical Company, density 0.664 g/ml. The 2.5mm refers to the average diameter of the pellets.

A second series of runs was conducted under the same conditions utilizing a bed packing of about sixty percent of the commercial CMS material and about forty percent of commuted CMS material having a particle size range of −40/+60 mesh, i.e. all particles will pass a 40 mesh U.S. Standard sieve and be retained on a 60 mesh U.S. Standard sieve, density, 0.749 g/ml. The ratio of the average diameter of the CMS material to the average diameter of the commuted fines was about 10:1. At steady state, product purity was ninety-nine percent. The results are given in Table I. All runs were at 100 psig pressure.

TABLE I

| Cycle Time Seconds | Spec. Prod. Liter/Hr. | Mass Sp. Prod. m³/Tonne/Hr. | Yield Percent |
|---|---|---|---|
| Commercial CMS | | | |
| 480 | 45.76 | 68.92 | 55.45 |
| 480 | 48.27 | 72.69 | 57.14 |
| 360 | 57.90 | 87.20 | 55.59 |
| Commercial CMS | | | |
| 360 | 58.31 | 87.82 | 53.53 |
| 180 | 74.79 | 112.64 | 50.53 |
| 180 | 75.25 | 113.33 | 52.08 |
| 120 | 82.23 | 124.74 | 47.43 |
| 120 | 83.41 | 125.62 | 46.30 |
| 90 | 85.96 | 129.46 | 41.86 |
| 60% Commercial CMS/40% Fines (−40, +60 Mesh) | | | |
| 480 | 49.52 | 66.11 | 57.84 |

TABLE I-continued

| Cycle Time Seconds | Spec. Prod. Liter/Hr. | Mass Sp. Prod. m³/Tonne/Hr. | Yield Percent |
| --- | --- | --- | --- |
| 480 | 50.50 | 67.43 | 62.43 |
| 360 | 66.60 | 88.92 | 56.72 |
| 360 | 69.14 | 92.31 | 54.94 |
| 360 | 70.07 | 93.55 | 55.81 |
| 180 | 82.22 | 109.77 | 42.24 |
| 180 | 90.00 | 120.16 | 53.96 |
| 180 | 95.19 | 127.09 | 53.89 |
| 180 | 99.23 | 132.48 | 55.39 |
| 180 | 96.72 | 129.13 | 52.64 |
| 120 | 106.26 | 141.87 | 49.52 |
| 120 | 111.44 | 148.80 | 49.20 |
| 90 | 105.53 | 140.89 | 46.41 |

The data in Table I demonstrate improved results for all cycles utilizing the coarse/fines mixture. The greatest degree of improvement was produced using cycle times between 120 and 180 seconds. The improvement in yield and mass specific product obtained is considered commercially significant.

We claim:

1. A process for enriching a gas stream in a primary product gas comprising introducing said gas stream into a pressure swing adsorption system including at least one adsorbent bed containing coarse particles of kinetically-selective molecular sieve material and from about 10 to 50 percent by volume of fine particles of kinetically-selective molecular sieve material wherein the fine particles are greater than 200 mesh and the coarse particles have an average diameter of 1 to 7 mm, and the ratio of the average diameter of the coarse particles to the average diameter of the fine particles is between about 5:1 and 15:1.

2. A process in accordance with claim 1 wherein said kinetically selective sieve material is carbon molecular sieve material, said gas stream is air and said primary product gas is nitrogen.

3. A process in accordance with claim 1, wherein said coarse sieve material is carbon molecular sieve pellets having an average diameter of 2.5 to 3 mm and said fine particles are carbon molecular sieve between 40 and 60 mesh.

4. A process in accordance with claim 1, wherein said bed contains from about 38 to 42 percent of the fine particles.

5. In a system for enrichment of one or more components of a gas mixture by pressure swing adsorption comprising at least one adsorbent bed and means to pass the gas mixture through the bed under pressure, said bed containing coarse particles of a kinetically-selective molecular sieve material, the improvement wherein said bed also contains fine particles of kinetically-selective sieve material the fine particles are greater than 200 mesh and the coarse particles have an average diameter of 1 to 7 mm, the ratio of the average diameter of the coarse particles to the average diameter of the fine particles is between about 5:1 and about 15:1 and the fine particles comprise from about ten to fifty percent by volume of the bed.

6. A system in accordance with claim 5, wherein the fine particles are carbon molecular sieve.

7. A system in accordance with claim 5, wherein the coarse particles are carbon molecular sieve.

8. A system in accordance with claim 5, wherein said bed contains from about 38 to 42 percent by volume of fine particles.

9. A system in accordance with claim 5, wherein the coarse sieve material is carbon molecular sieve pellets having an average diameter of from about 2.5 to 3 mm and the fine particles are carbon molecular sieve between 40 and 60 mesh.

* * * * *